UNITED STATES PATENT OFFICE.

CHARLES CATLETT, OF STAUNTON, VIRGINIA, ASSIGNOR TO THE BRITISH POTASH COMPANY, LIMITED, OF LONDON, ENGLAND.

TREATMENT OF ORES FOR PRODUCTION OF METAL AND OF POTASSIUM COMPOUNDS.

1,311,043.     Specification of Letters Patent.     Patented July 22, 1919.

No Drawing.     Application filed February 18, 1918. Serial No. 217,922.

*To all whom it may concern:*

Be it known that I, CHARLES CATLETT, a citizen of the United States, residing at Staunton, county of Augusta, and State of Virginia, have invented certain new and useful Improvements in the Treatment of Ores for Production of Metal and of Potassium Compounds; and I do hereby declare the following to be a full, clear, and exact description of the invention, such as will enable others skilled in the art to which it appertains to make and use the same.

This invention relates to treatment of ores for production of metal and of potassium compounds; and it comprises a process in which a metalliferous ore or mineral, such as iron ore, is smelted with the aid of suitable fuel and fluxing material in an appropriate furnace, more especially a blast furnace, combined potassium being carried to a greater or less extent by the ore, the fuel, or the flux, or by all of them, and the furnace charge being arranged to include one or more constituents acting specifically to liberate potassium compounds from the slag in relatively easily volatilizable condition, or to oppose conversion of volatilized or suspended potassium compounds into less soluble condition, or to perform both these functions, the dust-laden gases leaving the furnace being led off and treated for recovery of potash values, and molten metal being tapped from the furnace.

The invention is particularly applicable to the recovery of potash values from the dust and gases leaving iron blast furnaces, and the principles of the invention will therefore be explained hereinafter in connection with the manufacture of iron in the blast furnace. It is to be understood, however, that although such application constitutes an especially desirable and important embodiment of the invention, nevertheless the invention in its broader aspects is not limited thereto.

It is well known that in producing pig iron in the blast furnace, appreciable amounts of combined potassium pass off with the dust and gases leaving the upper part of the blast furnace, and also that varying amounts are retained by and lost in the slag tapped from the furnace. These potassium compounds are derived in part from the iron ore used and also from the coke and flux charged with the ore into the furnace, the amount derived from each of these sources differing with the different types of ore, coke and flux used. In iron ore at present commonly employed in the blast furnace, the potash values present, figured as $K_2O$, amount ordinarily to only a small fraction of 1 per cent. and the same holds true also for the coke and flux. But in the aggregate, the total amount of potash values leaving the blast furnace in the enormous volumes of dust-laden gases and in the slag are known to be very considerable, even where the raw materials going into the furnace charge are low in combined potassium. This fact has long been recognized, and attempts have been made to recover a part of the potash values thus ordinarily going to waste by passing the gases from the downcomer through settling chambers, where more or less of the dust suspended in the gases is collected by subsidence, and the dust thus collected is then ordinarily disposed of without further treatment on the basis of the potash values contained therein. Beyond this, recovery of potash values from blast furnace gas has not been attempted, and no attempt has been made, so far as I am aware, to reduce the percentage of potash values lost in the slag.

It is well known that in the blast furnace dust collected in the manner above described, part of the combined potassium is present in somewhat difficultly soluble form, that is, in such form that such dust, when analyzed by the official agricultural methods, shows a substantial proportion of its contained potash in a form classed as "insoluble potash." It is a principal object of the invention to materially reduce this proportion of so called "insoluble potash" in potash values recoverable from blast furnace gases and to correspondingly increase the proporton of easily soluble potash. Another object of the invention is to reduce the amount of potash values entering the slag. Still another object of the invention is to effect a much more complete liberation and elimination of potash values from the slag, with volatilization and recovery of said potash values, than has been the case heretofore in practice. By attainment of these objects, in the manner hereinafter set forth, not only is the yield of potassium compounds recoverable from the dust and gases of the furnace measurably increased, but the proportion of available or "soluble potash" is also increased.

This invention is based in part upon the discovery and recognition of the fact that the varying but usually important proportions of so-called insoluble potash present in the dust and gases from blast furnaces, is due to reaction in a zone or zones of the furnace above the fusion zone between volatilized potassium compounds and acidic radicals such as alumina, silica, etc., suspended in finely divided condition in the furnace gases, or otherwise present in reactive contact with said gases. These acidic radicals may be derived from a number of sources, but a large proportion of them is contributed by the ash of the coke which is used in the furnace charge and which may be consumed high in the furnace stack. This ash is in a very finely divided and reactive condition, and reaction between it and volatilized potassium compounds at furnace temperatures occurs readily. According to one phase of the process of the present invention, this reaction, whereby combined potassium volatilized in the lower part of the blast furnace tends to be converted into less soluble form, is prevented at least in large measure by insuring the presence in the furnace atmosphere of a substance capable of opposing such reaction. Such substance is most desirably capable of being volatilized at the temperatures involved, and should also be capable of furnishing an acid radical with which potassium forms a readily soluble and volatilizable compound. For the purposes of this invention, it is particularly desirable to obtain the combined potassium finally in the form of a halogen compound, and accordingly the most convenient reagent to employ in opposing the reversion of combined potassium to relatively insoluble condition is sodium chlorid or common salt.

The invention is also based upon recognition of the fact that by insuring the presence in the fusion zone of a substance which will tend to liberate combined potassium from the apparently refractory forms in which it appears to exist in blast furnace slags under ordinary conditions, a part of the combined potassium usually retained by the slag and lost is freely volatilized at the temperature of fusion, and is, therefore, added to the amount usually present in blast furnace gas and dust under the conditions heretofore prevailing in practice. The substance relied upon to perform this function may be the same substance used to oppose the conversion of volatilized potassium compound into less soluble condition, or it may be a different substance acting only or mainly in the specific capacity of a liberator of combined potassium from the slag. If common salt be employed, it may work down into the fusion zone to some extent and enter the fused bath of slag, thus acting in a dual capacity, that is being partly volatilized above the fusion zone and opposing the tendency of volatilized potassium compounds to form less soluble compounds and also reacting with the slag to liberate combined potassium and enable it to be volatilized as chlorid.

The process is applicable to the treatment of any iron ore which can be profitably smelted in the blast furnace, and it is also applicable to very low grade ores or minerals relatively high in potash values but so low in iron that they have not been useful heretofore for production of iron. For example, a natural silicate of iron and potash, such as glauconite or greensand, which is not sufficiently high in iron to be smelted according to prior practice for production of that metal, may be successfully and profitably treated by the present process. Similarly, many low grade potassiferous iron ores, available particularly in the Southern States, can be worked to advantage in the practice of this invention.

In a specific example embodying the principles of the invention, a low grade potassiferous iron ore, analyzing about 45 per cent. iron and carrying about 1 per cent. combined potassium (figured as $K_2O$), is charged into a blast furnace together with the proper proportions of coke and limestone to effect reduction of the iron and to slag off the non-metallic constituents of the ore. At the same time, a relatively small percentage of sodium chlorid or common salt is also charged into the furnace in any suitable manner. The salt may be roughly mixed with the ore, or the coke or the limestone, or with all three; or it may merely be introduced into the furnace from time to time without being specially mixed with the charge. As the charge descends in the furnace, the added salt is eventually volatilized to a large extent in the high temperature zones, the salt vapor mingling with the furnace gases which carry potash volatilized from a lower zone in the furnace. The salt vapor acts to prevent interaction between the volatilized potash and acidic materials present, such as the acidic constituents of the finely divided fuel ash suspended in the furnace gases, and also prevents it from forming a permanent union with the slag forming elements of the furnace charge, the result being that the potash values pass out of the blast furnace in relatively soluble condition, largely as chlorid. The amount of salt added to the blast furnace will vary somewhat in accordance with the character of the charge, but as a rule only a relatively small percentage is necessary to materially increase the proportion of "soluble potash" recoverable from the furnace gases, and as little as one-half of 1 per cent. of the weight of the charge is sufficient to accomplish commercially valuable results.

A part of the added salt may work down through the furnace into the fusion zone and enter into the slag in spite of the fact that theoretically the high temperature there prevailing would tend to prevent this. Such salt thereupon reacts with the slag, liberating therefrom potassium combined as potassium chlorid which is at once volatilized and passes upwardly through the furnace with the furnace gases.

Another mode of insuring liberation of potash values from the slag or largely preventing entrance of potash values thereinto, is to introduce into the furnace a suitable material which is substantially non-volatile and which will therefore melt down with the charge and enter the slag in the fusion zone. An eminently suitable material for this purpose is calcium fluorid which is conveniently obtainable in many localities in the form of fluorite. The use of fluorite in metallurgical practice for the purpose of increasing the fluidity of the slag is of course well known; but so far as I am aware, its use has never been proposed in smelting to favor liberation and volatilization of potash values from the slag, in conjunction with recovery of potash values from the furnace dust and gases. The proportion of fluorite necessary to use in any given instance will of course depend upon the character of the ore, and will be larger in the case of low grade ores. In general, the amount of calcium fluorid added should be somewhat more than that theoretically required to react with what would be the normal potash content of the slag for production of potassium fluorid. It is desirable, but not essential, that the fluorite added be well broken up.

The dust-laden gases leaving the blast furnace may be treated in any suitable manner for recovery of the potash values contained therein. The operation of a furnace in accordance with the present invention makes it profitable to treat the gases very completely and systematically for thorough removal of potash values. For this reason, it is desirable not only to separate out the heavy dust by subsidence, as has been done heretofore to some extent in blast furnace practice, but also to subject the gases after passage from the settling chambers to further treatment, as for example, to an electrical precipitation treatment in apparatus of which the well known Cottrell system is fairly typical. Or it may be separated by bag filtration or any other means.

The potassiferous material thus separated from the dust-laden furnace gases may be disposed of as a fertilizer material without further treatment on the basis of its potash content. Where it is desired to separate and concentrate the potash salts, however, the potassiferous material may be leached, and the resultant solution may then be treated by well known methods to separate potash salts as such. Where this is done, any unchanged sodium chlorid or other agent which may have been carried over with the potash salts in the furnace gases, may also be separated and used over again in the process, thus lessening the operating cost.

The described process is also applicable to the treatment of certain ores and concentrates of other metals such as copper, gold, etc., where the accompanying gangue is frequently high in potash content.

Although sodium chlorid and calcium fluorid have been specifically referred to as suitable materials to employ in carrying out the process of this invention, it is to be understood that the invention is not limited to the use of these particular materials. In general, halogen compounds of bases such as the halids of the alkali metals and of the alkaline earth metals, for example, are especially suitable for the purposes of the present process for the reason that they react with combined potassium in the furnace in such manner as to give soluble and easily volatilizable potassium compounds while at the same time neutralizing the effect of those acid radicals whose combination with potash or potassium compounds it is desired to prevent or oppose. It is obvious that more than one agent may be used at once in the furnace charge to favor volatilization and solubilization of potash. Thus, both sodium chlorid and calcium fluorid may be employed together, where desirable or advisable on account of the particular character of the ore or mineral to be smelted. It is to be noted also that such agent or agents may properly be included within the term flux or fluxing material. The term metal as herein employed is to be understood as including any metallic material resulting from the reduction of the ore or mineral whether it be a single metal such as pig iron, copper, etc., or metal alloys, mattes, etc., such metallic material of course being tapped from the furnace in molten condition in any unusual or suitable manner.

What I claim is:

1. The process of treating a metalliferous ore carrying potash values for the production of both metal and potassium compounds, which comprises smelting such an ore in an appropriate furnace with the aid of suitable fuel and fluxing material, and in the presence of additional material comprising a salt specifically favoring relatively complete volatilization of combined potassium from the slag, tapping metal from the furnace, and recovering potash values from the gases conducted from the furnace.

2. The process of treating a metalliferous ore carrying potash values for the production of both metal and potassium compounds, which comprises smelting such an ore in a suitable furnace in the presence of a halogen compound of a base, tapping metal from the furnace, and treating the furnace gases for recovery of potash values.

3. The process of treating a metalliferous ore carrying potash values for the production of both metal and potassium compounds, which comprises smelting such an ore in a blast furnace in the presence of a sodium halid, tapping metal from the furnace, and recovering potash values from the furnace gases.

4. The process of producing metal and potassium compounds which comprises smelting metalliferous and potassiferous mineral matter with fuel and flux in a suitable furnace, the furnace charge being arranged to include a salt acting to favor volatilization of combined potassium, recovering potash values from the furnace gases, and obtaining metal from the furnace.

5. The process of producing metal and potassium compounds which comprises smelting metalliferous and potassiferous mineral matter with fuel and flux in a suitable furnace, the furnace charge being arranged to include a halogen compound of a base, recovering potash values from the furnace gases, and obtaining metal from the furnace.

6. The process of producing metal and potassium compounds which comprises smelting metalliferous and potassiferous mineral matter with fuel and flux in a suitable furnace, the furnace charge being arranged to include sodium chlorid, recovering potash values from the furnace gases, and obtaining metal from the furnace.

7. The process of producing iron and potasium compounds, which comprises smelting iron ore in a suitable furnace, tapping off molten iron, insuring the presence in the furnace atmosphere of a salt tending to prevent conversion of volatilized or suspended potassium compounds into less soluble condition, leading off the furnace gases, and recovering potash values therefrom.

8. The process of producing iron and potassium compounds, which comprises smelting iron ore in a blast furnace in the presence of a halogen compound of a base, tapping metal from the furnace, and treating the effluent furnace gases for recovery of potash values.

9. The process of producing iron and potassium compounds which comprises charging into a blast furnace low grade iron ore relatively high in combined potassium, coke, and limestone in proper proportions, together with a fraction of one per cent. of sodium chlorid, fusing the charge to produce metallic iron and to volatilize combined potassium, and treating the furnace gases for recovery of potash values.

10. The process of producing metal and potassium compounds which comprises smelting metalliferous and potassiferous mineral matter with fuel and flux in a suitable furnace, the furnace charge being arranged to include a volatilizable compound acting to favor volatilization of combined potassium, treating the effluent furnace gases to recover potassiferous material therefrom, separating potash salts and a portion of said volatilizable compounds from said material, and returning such separated portion of said volatilizable compounds to the furnace.

11. The process of treating a metalliferous ore carrying potash values for the production of potassium compounds, which comprises smelting such an ore in a suitable furnace in the presence of a halogen compound of a base, and treating the furnace gases for recovery of potash values.

12. The process of treating a metalliferous ore carrying potash values for the production of potassium compounds, which comprises smelting such an ore in a blast furnace in the presence of a sodium halid, and recovering potash values from the furnace gases.

13. The process of producing potassium compounds which comprises smelting metalliferous and potassiferous mineral matter with fuel and flux in a suitable furnace, the furnace charge being arranged to include a salt acting to favor volatilization of combined potassium, recovering potash values from the furnace gases.

14. The process of producing potassium compounds which comprises smelting metalliferous and potassiferous mineral matter with fuel and flux in a suitable furnace, the furnace charge being arranged to include sodium chlorid, recovering potash values from the furnace gases.

15. The process of producing potassium compounds which comprises smelting iron ore in a suitable furnace, insuring the presence in the furnace atmosphere of a salt tending to prevent conversion of volatilized or suspended potassium compounds into less soluble condition, leading off the furnace gases, and recovering potash values therefrom.

16. The process of producing potassium compounds which comprises smelting iron ore with fuel and flux in a blast furnace, a small percentage of sodium chlorid being included in the furnace charge, and recovering potash values from the furnace gases.

In testimony whereof I hereunto affix my signature.

CHARLES CATLETT.

Copies of this patent may be obtained for five cents each, by addressing the "Commissioner of Patents, Washington, D. C."